US012038774B2

(12) United States Patent
Maier et al.

(10) Patent No.: US 12,038,774 B2
(45) **Date of Patent: *Jul. 16, 2024**

(54) CONTROL CENTER FOR AN AERIAL DEVICE COMPRISING A ROTATABLE JOYSTICK

(71) Applicant: IVECO MAGIRUS AG, Ulm (DE)

(72) Inventors: Thomas Maier, Stuttgart (DE); Markus Schmid, Stuttgart (DE); Roland Mandel, Stuttgart (DE); Kristian Karlovic, Stuttgart (DE); Philipp Pomiersky, Stuttgart (DE); Jens Kraemer, Ulm/Donau (DE)

(73) Assignee: IVECO MAGIRUS AG, Ulm (DE)

( * ) Notice: Subject to any disclaimer, the term of this patent is extended or adjusted under 35 U.S.C. 154(b) by 822 days.

This patent is subject to a terminal disclaimer.

(21) Appl. No.: 16/099,497

(22) PCT Filed: May 23, 2017

(86) PCT No.: PCT/EP2017/062480
§ 371 (c)(1),
(2) Date: Nov. 7, 2018

(87) PCT Pub. No.: WO2017/202880
PCT Pub. Date: Nov. 30, 2017

(65) Prior Publication Data

US 2019/0107861 A1 Apr. 11, 2019

(30) Foreign Application Priority Data

May 23, 2016 (IT) ........................ 102016000052468

(51) Int. Cl.
*G05G 9/047* (2006.01)
*B66F 11/04* (2006.01)
(Continued)

(52) U.S. Cl.
CPC ............ *G05G 9/047* (2013.01); *B66F 11/046* (2013.01); *E06C 5/04* (2013.01); *G05G 1/01* (2013.01); *G05G 2009/04781* (2013.01)

(58) Field of Classification Search
CPC ..................... G05G 9/047; G05G 1/01; G05G 2009/04781; B66F 11/046; E06C 5/04
See application file for complete search history.

(56) References Cited

U.S. PATENT DOCUMENTS 3,388,821 A * 6/1968 White, Jr. ............ E02F 9/2004 414/715
4,775,029 A * 10/1988 MacDonald .......... B66F 11/046 52/117
(Continued)

FOREIGN PATENT DOCUMENTS

EP 0 867 595 A2 9/1998
FR 2 911 376 A1 7/2008
(Continued)

OTHER PUBLICATIONS

Office Action issued in the counterpart Japanese Application No. 2018-560507 dated Apr. 27, 2021, including English translation obtained from Global Dossier (7 pages).
(Continued)

*Primary Examiner* — Daniel P Cahn
*Assistant Examiner* — Matthew R. Shepherd
(74) *Attorney, Agent, or Firm* — KLINTWORTH & ROZENBLAT IP LLP

(57) ABSTRACT

Control center for an aerial device, said aerial device comprising a main boom part mounted with a first end on a turret, the main boom part being inclinable around a horizontal axis in a first inclination movement, rotatable around a vertical axis in a rotation movement, and extendable and retractable along its longitudinal extension direction in a first telescopic movement, wherein the control center comprises
(Continued)

a first joystick configured for controlling the first inclination movement by tilting the first joystick around a first control axis, controlling the rotation movement by tilting the first joystick around a second control axis perpendicular to the first control axis, and for controlling the first telescopic movement by rotating the first joystick around its stick axis.

13 Claims, 3 Drawing Sheets

(51) Int. Cl.
*E06C 5/04* (2006.01)
*G05G 1/01* (2008.04)

(56) References Cited

U.S. PATENT DOCUMENTS

| | | | | |
|---|---|---|---|---|
| 5,002,454 | A * | 3/1991 | Hadank | E02F 9/2025<br>74/471 XY |
| 5,160,239 | A * | 11/1992 | Allen | E02F 9/2025<br>700/65 |
| 5,211,245 | A * | 5/1993 | Relyea | A62C 27/00<br>169/25 |
| 5,286,159 | A * | 2/1994 | Honma | B66F 11/046<br>182/2.11 |
| 5,584,346 | A * | 12/1996 | Sakamoto | E02F 9/2004<br>701/50 |
| 5,687,080 | A * | 11/1997 | Hoyt | G05G 9/047<br>345/161 |
| 5,743,149 | A * | 4/1998 | Cullity | B66F 11/046<br>414/718 |
| 5,788,158 | A * | 8/1998 | Relyea | B05B 13/005<br>239/166 |
| 5,875,701 | A * | 3/1999 | Cobo | E02F 9/2214<br>91/511 |
| 6,024,191 | A * | 2/2000 | Backer | B66F 11/046<br>182/2.11 |
| 6,439,408 | B1 * | 8/2002 | Aquino | B66C 13/54<br>212/300 |
| 6,932,183 | B2 * | 8/2005 | Jeppe | G05G 1/58<br>180/333 |
| 7,055,630 | B1 * | 6/2006 | Burton | E02D 27/42<br>175/203 |
| D555,676 | S * | 11/2007 | Haubrich | D15/28 |
| 7,635,045 | B2 * | 12/2009 | Shearer | E02F 9/2004<br>180/315 |
| 7,729,835 | B2 * | 6/2010 | Morris | E02F 9/2004<br>700/83 |
| 8,146,704 | B2 * | 4/2012 | Ruhter | E02F 9/16<br>180/326 |
| 8,380,402 | B2 * | 2/2013 | Hobenshield | E02F 9/2004<br>700/83 |
| 8,521,371 | B2 * | 8/2013 | Faivre | G05B 19/106<br>701/50 |
| 8,622,170 | B2 * | 1/2014 | Bean | B66F 17/006<br>182/2.11 |
| 8,985,263 | B2 * | 3/2015 | Peterson | B60N 2/797<br>180/317 |
| 11,015,390 | B2 * | 5/2021 | Maier | G05G 1/01 |
| 2001/0015165 | A1 * | 8/2001 | McKenney | G05D 1/0206<br>114/144 R |
| 2002/0166267 | A1 * | 11/2002 | McGugan | E02F 9/2004<br>37/348 |
| 2005/0224439 | A1 * | 10/2005 | Bean | B66F 11/046<br>212/280 |
| 2006/0061122 | A1 * | 3/2006 | Billger | B66F 9/0759<br>296/65.07 |
| 2010/0302017 | A1 * | 12/2010 | Guglielmo | B66F 11/04<br>345/161 |
| 2011/0025108 | A1 * | 2/2011 | Wihinen | B60N 2/797<br>74/471 XY |
| 2011/0297764 | A1 * | 12/2011 | Svanebjerg | B64F 5/23<br>239/722 |
| 2013/0313044 | A1 * | 11/2013 | Stewart | B66F 11/046<br>182/63.1 |
| 2015/0120152 | A1 * | 4/2015 | Lauterjung | E06C 5/18<br>701/49 |
| 2016/0145940 | A1 * | 5/2016 | Aiken | B60R 3/02<br>182/64.1 |
| 2021/0010233 | A1 * | 1/2021 | Ogata | E02F 9/2004 |

FOREIGN PATENT DOCUMENTS

| | | | | |
|---|---|---|---|---|
| FR | 2911376 | A1 * | 7/2008 | B60N 2/4606 |
| JP | 2002104794 | A | 4/2002 | |
| JP | 2009155028 | A | 7/2009 | |
| JP | 2010222087 | A | 10/2010 | |

OTHER PUBLICATIONS

Patent Cooperation Treaty, International Search Report and Written Opinion for International Application No. PCT/EP2017/062480, Aug. 14, 2017, 12 pages.

* cited by examiner

CONTROL CENTER FOR AN AERIAL DEVICE COMPRISING A ROTATABLE JOYSTICK

CROSS-REFERENCE TO RELATED APPLICATIONS

The present application claims priority to PCT International Application No. PCT/EP2017/062480 filed on May 23, 2017, which application claims priority to Italian Patent Application No. 102016000052468 filed May 23, 2016, the entirety of the disclosures of which are expressly incorporated herein by reference.

STATEMENT RE: FEDERALLY SPONSORED RESEARCH/DEVELOPMENT

Not applicable

TECHNICAL FIELD

The present invention relates to a control center for an aerial device.

BACKGROUND ART

One example for such an aerial device is a telescopic turnable ladder of a firefighting vehicle. It comprises at least one ladder set mounted on a turret with a first end, such that it can be inclined around a horizontal axis and rotated around a vertical turret axis. This ladder set shall be denoted as a main boom part in the following, while the inclination of this main boom part shall be denoted as a first inclination movement. Moreover, the main boom part can be telescopically extended and retracted along its longitudinal extension direction in a telescopic movement, which shall be denoted as first telescopic movement. In some embodiments, an extension boom part is mounted by a hinge mounting at the second end of the main boom part, such that the extension boom part can be inclined with respect to the main boom part in a second inclination movement. The extension boom part represents an extension of the ladder to increase its range in a radial direction from the turret, as well as the accessible height from the ground.

The different movements of the main boom part and, if present, the extension boom part are controllable by a human operator located at a control center which comprises different control means. A very common and approved control means is a joystick, which is a control lever which can be tilted around two axes perpendicular to each other. Each axis corresponds to one degree of freedom to be controlled. In the present case, a joystick can be used for controlling the first inclination movement, i. e. the inclination of the main boom part, and the rotation movement of the main boom part around the turret.

The first telescopic movement of the main boom part represents an additional degree of freedom, which cannot be controlled by a joystick according to the prior art. In a common solution, an additional control device is present at the control center, which is represented by a second joystick for controlling the telescopic movement of the main boom part by a tilting movement of this second joystick in a forward and rearward direction. This means that for controlling all degrees of freedom of the main boom part as discussed above, i. e. the first inclination movement, the rotation movement and the first telescopic movement, two different control devices are present which must be operated by the left and right end of the operator. That is, for controlling the main boom part, the movements of the left and right hands of the operator must be coordinated. It has turned out that this concept does not provide an intuitive and ergonomic way of controlling the different degrees of freedom even of simple ladders with only one main boom part. Moreover, this is even more true for more complex ladders which comprise an extension boom part at the free end of the main boom part, which is inclinable around a horizontal hinge axis with respect to the main boom part, and which may also be extendable and retractable in a second telescopic movement.

DISCLOSURE OF INVENTION

It is therefore an object of the present invention to provide a control center for an aerial device of the above kind which represents a control concept that allows an intuitive control of the inclination movement, the rotation movement and the telescopic movement of a main boom part as described above only by one joystick.

This object is achieved by a control center comprising the features of claim 1.

According to the present invention, the control center comprises a first joystick configured for controlling the first inclination movement of the main boom part by tilting the first joystick around a first control axis, controlling the rotation movement of the main boom part around its vertical axis by tilting the first joystick around a second control axis perpendicular to the first control axis, and for controlling the first telescopic movement by rotating at least a section of the first joystick around the stick axis of the joystick. The first and second control axis of the joystick correspond to the usual joystick axis, allowing an intuitive control of the inclination movement and the rotation movement, respectively. Extending and retracting the main boom part is performed by turning the joystick around its stick axis. This concept allows the control of three different degrees of freedom of the main boom part by only one joystick.

According to a preferred embodiment of the present invention, the aerial device further comprises an extension boom part mounted to the second end of the main boom part by a hinge mounting and being inclinable around a horizontal hinge axis with respect to the main boom part in a second inclination movement, and the control center comprises a second joystick configured for controlling the second inclination movement by tilting the second joystick around a tilting control axis of the second joystick. Although two different joysticks are present in this embodiment, the degrees of freedom of moving the main boom part are controlled by the first joystick only, while the movement of the tension boom part is controlled by a second joystick separated from the first joystick and being controllable in an independent way.

More preferably, the extension boom part is extendable and retractable along its longitudinal extension direction in a second telescopic movement, and the second joystick is configured for controlling the second telescopic movement by rotating the second joystick around its stick axis. In this way, the second telescopic movement is controlled in a way comparable to the control of the first telescopic movement by the first joystick. This makes the way of controlling the first and second telescopic movement even more intuitive and ergonomic.

More preferably, the first joystick comprises a lateral protrusion protruding from the stick axis in a radial direction. This lateral protrusion may be provided at an outer jacket portion of an end section of the first joystick which is turnable around a fixed inner axis portion. It allows the user to get a better haptic feeling of the turning position of the joystick around its stick axis, and it prevents slipping of the joystick in this turning movement. This is important in particular for joysticks which can be turned around their stick only against a restoring force, so that a certain torque must be applied to turn them. The application of such a turning torque is easier when the lateral protrusion is present.

According to another preferred embodiment of the present invention, a second joystick also comprises a lateral protrusion protruding from the stick axis in a radial direction.

Preferably the lateral protrusion has a flag shape.

More preferably, at least one of the first joystick and second joystick comprises at least one switch disposed on its top end or on its circumferential surface. The term “switch” shall denote any switching device which is capable of being set into two different states, i. e. to be switched from one first state to a second state and back, including switching devices which remain in their present switching position after being switched, and also switching devices which are set back to their original switching state when no mechanical pressure by the operator is applied. Such switching devices can include switch buttons which keep a first state (corresponding to a first operation mode) when no pressure is applied, an which are switched into a second state (corresponding to a second operation mode) when mechanical pressure is applied, which return to the first state when a pressure is released.

More preferably, the at least one switch is a movement restriction control switch for activating/deactivating a movement restriction of the aerial device.

Even more preferably, the at least one switch is a communication control switch for activating/deactivating a communication function of the aerial device.

According to another preferred embodiment of the present invention, the control center comprises at least one arm rest, with the first joystick being disposed at the front end of the arm rest. In this embodiment, the human operator may lay her/his forearm on top of the arm rest, with her/his hand or finger operating the first joystick. It is also possible that the second joystick is disposed, in the same way, at the front end of another arm rest for taking the other forearm of the operator, to be operated by the other hand.

More preferably, the first control axis of the first joystick is generally perpendicular to the extension direction of the arm rest.

According to another preferred embodiment of the present invention, the control center comprises an operator’s seat, with a back rest and two left and right arm rests, disposed laterally at two opposite sides of the back rest, with the first joystick being disposed at one of the arm rest, at the second joystick being disposed at the other arm rest.

Preferably, the tilting control axis of the second joystick is generally perpendicular to the extension direction of the other arm rest mentioned above.

The present invention is further related to a fire fighting vehicle, comprising a turnable ladder as an aerial device, and a control center of the above kind.

BRIEF DESCRIPTION OF THE DRAWINGS

The present invention will be elucidated more clearly with respect to preferred embodiments of the present invention, which will be described hereinafter by means of the following figures.

BEST MODE FOR CARRYING OUT THE INVENTION

Figure 1:
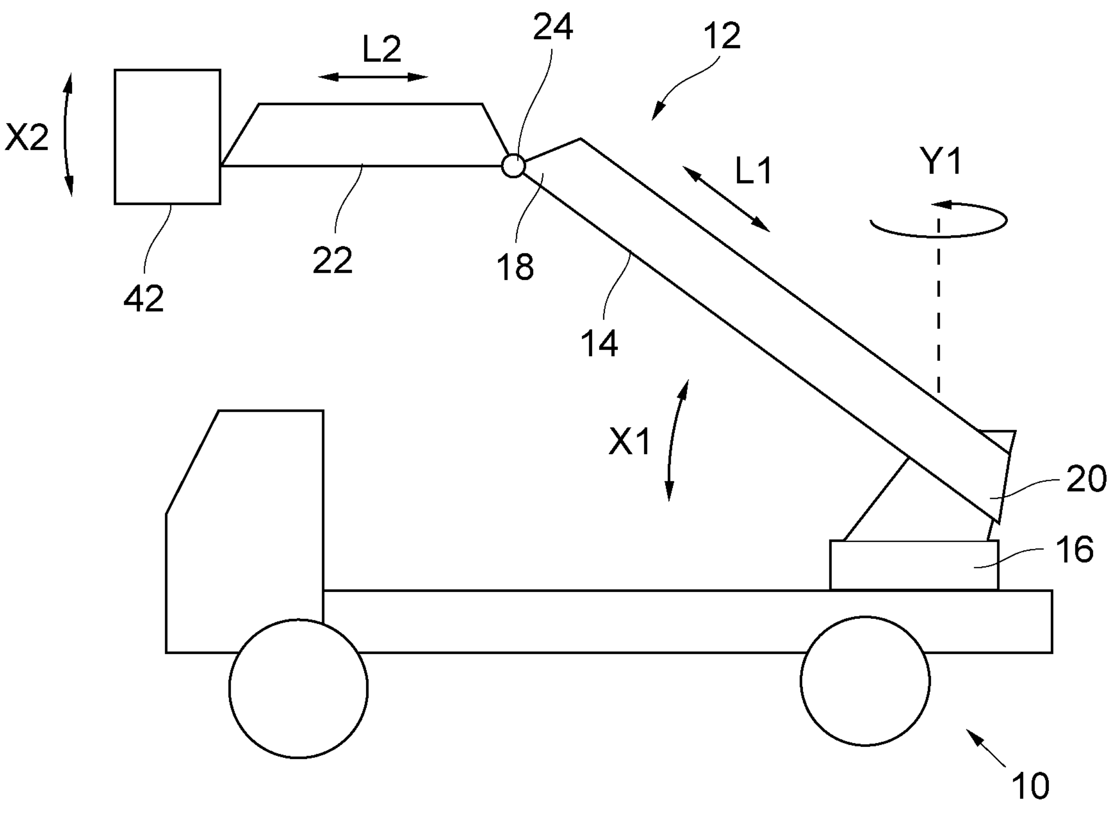
FIG. 1 is a schematic view of a firefighting vehicle according to a first embodiment of the present invention, demonstrating the different degrees of freedom of a turnable ladder as an aerial device mounted on top of the firefighting vehicle.

FIG. 1 shows a firefighting vehicle 10 comprising a turnable ladder 12 representing an aerial device which is mounted on top of a rear portion of the firefighting vehicle 10. The turnable ladder 12 comprises a main boom part 14 which is mounted with one end on a turret 16 to be rotatable around a vertical axis. A corresponding rotation movement shall be denoted as Y1 in the following, as it is the case in FIG. 1. Moreover, the main boom part 14 can be inclined around a horizontal axis located at or near the turret 16 in a first inclination movement X1. By this inclination movement X1, the other end of the main boom part 14 can be lifted or lowered. The main boom part 14 represents a main ladder set of the turnable ladder 12, which can be extended or retracted along its longitudinal extension direction in a first telescopic movement L1. In this first telescopic movement L1, the different elements of the ladder set (not shown in detail in FIG. 1) are shifted with regard to one another such that the free (second) end 18 of the main boom part moves away or approaches the first end 20 which is mounted on the turret 16.

At the second end 18 of the main boom part 14, an extension boom part 22 is mounted by a hinge mounting 24 having a horizontal hinge axis. The extension boom part 22 is inclinable around the hinge axis 24 with respect to the main boom part 14 in a second inclination movement X2. In the present embodiment, the extension boom part 22 is also represented by a ladder set comprising different ladder elements that can be telescopically extended and retracted along the longitudinal extension direction of the extension boom part 22 in a second telescopic movement L2 to elongate or to shorten the length of the extension boom part 22. At the front top end of the extension boom part 22, a rescue cage 42 is mounted.

Figure 2:
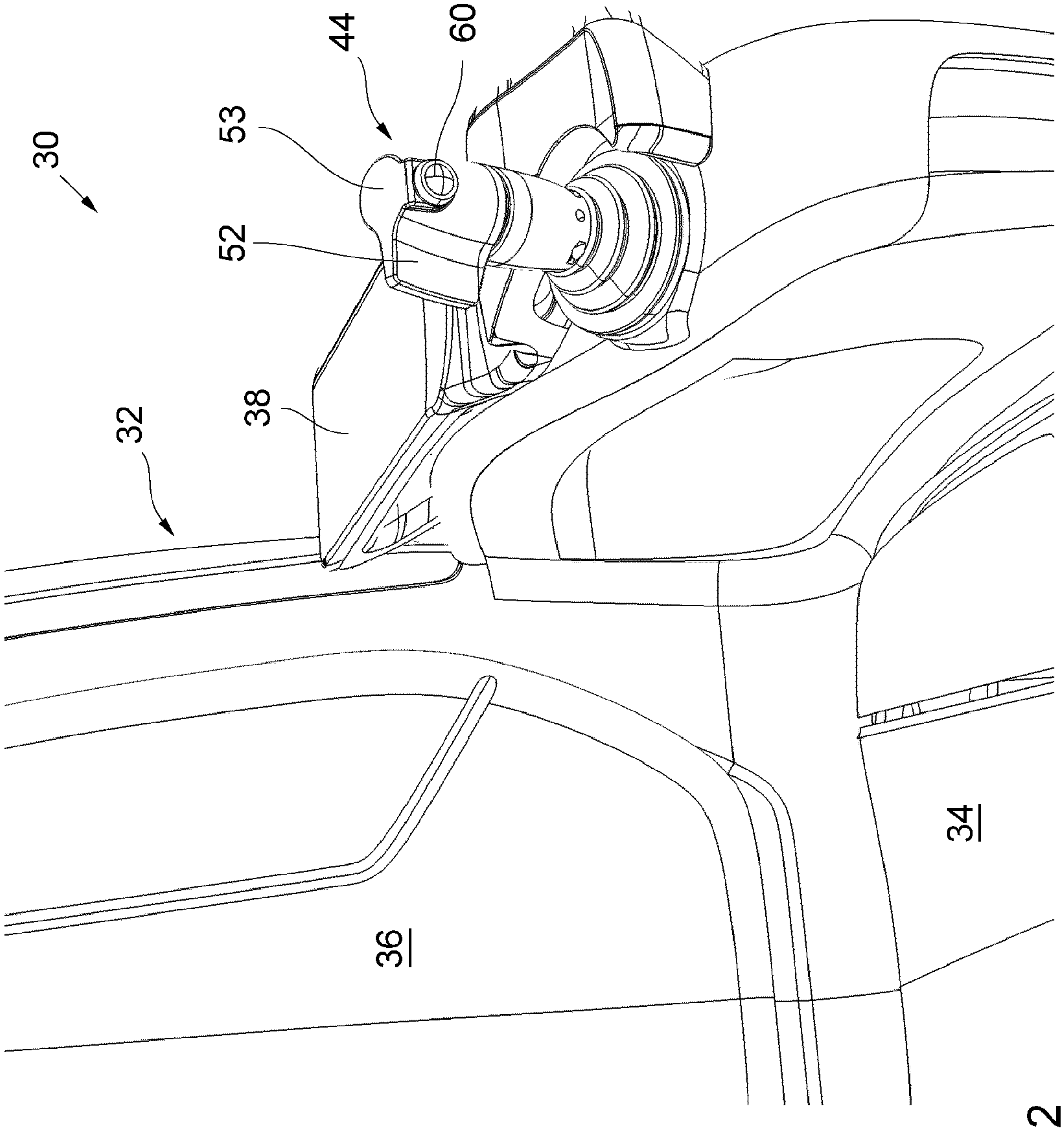
FIGS. 2 and 3 are different views of a control center of the turnable ladder of the firefighting vehicle shown in FIG. 1.
Figure 3:
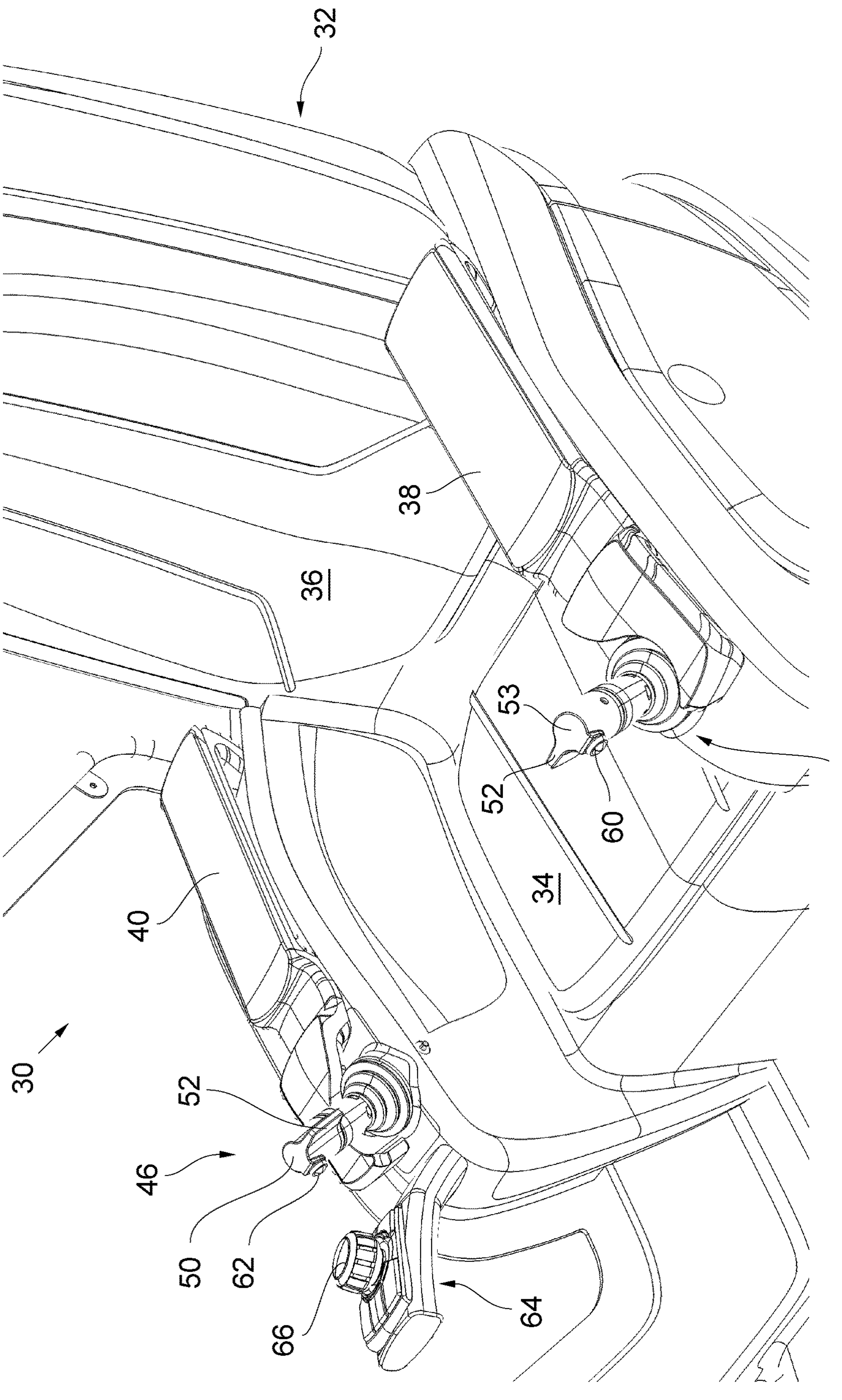

The different movements X1, Y1, X2, L1 and L2 described above can be controlled from a control center 30, which is shown in more detail in FIGS. 2 and 3. The control center 30 comprises an operator’s seat 32 on which a human operator can sit. The operator’s seat 32 comprises a seating 34, a backrest 36 disposed at the rear end of the seating 34, and left and right armrests 38,40 disposed laterally at opposite sides of the backrest 36.

The armrests 38, 40 are positioned such that a human operator sitting on the seating 34, with her/his back resting on the backrest 36, may lay down her/his forearms in a comfortable position on top of the respective backrests 38, 40. This allows a comfortable working position for the operator, with the top end, in particular the rescue cage 42 at the front top end of the extension boom part 22 in his field of view, to monitor all parts of the turnable ladder 12.

The control center 30 comprises two different control devices mounted on its left and right side in front of the respective armrests 38, 40. A first control device of these two control devices is a first joystick 44, which is tiltable around two control axes perpendicular to each other, namely in the left/right direction, and in a front/back direction. The first joystick 44 is mounted in a position that the operator can operate it with her/his left hand or finger(s) when her/his forearm rests on the left arm rest 38. It is noted here that the expressions "left", "right", "front" and "back" refer to the perspective of the sitting position of the operator.

The second control device, which is shown in FIG. 3 only, is a second joystick 46 positioned at the front end of the right arm rest 40. In its configuration and disposition, the second joystick 46 is provided similar to the first joystick, so that the first joystick 44 and the second joystick 46 are arranged symmetrical with respect to an imaginary vertical mirror center plane through the apparatus seat 32. The second joystick 46 is also tiltable around two control axes perpendicular to each other, namely in the left/right direction, and in a front/back direction.

With respect to the configuration of each two perpendicular control axes, the first joystick 44 and the second joystick 46 correspond to common joysticks for controlling two different degrees of freedom of a device to be controlled, as will be described later. Moreover, an upper end section of each of the first joystick 44 and the second joystick 46 is rotatable around the stick axis 50,53 of the respective joystick. That is, additionally to the tilting movement of the stick axis 50,53 around the two perpendicular tilting control axes which are located at the bottom of the respective joystick 44,46, the upper end section of the stick itself can be rotated in itself. This end section is formed by an outer jacket portion of the end section of the first joystick which is turnable around a non-rotatable inner axis portion. This rotation is performed by applying a rotating force, i. e. a torque to the end section of the stick axis 50,53 by the operator's hand or fingers. It is noted that this rotation movement around the stick axis 50,53 can be performed independent from the tilting movement of the respective joystick 44,46 around a tilting control axis. The rotation of the joystick 44,46 around its stick axis 50,53 controls an additional degree of freedom of the device to be controlled, independent from the degrees of freedom which are controlled by tilting the respective joystick 44,46 around the first control axis and the second control axis, respectively.

For simplifying the application of a torque to the respective joystick 44,46, each end section of the first joystick 44 and second joystick 46 is provided with a lateral protrusion 52 protruding from the stick axis 50,53 in a radial direction away from the stick axis 50,53. Each of these protrusions 52 is generally flag-shaped, i. e. it has the shape of a generally flat plate with a main plane crossing the stick axis 50,53. By this protrusion 52, each joystick 44,46 has a cross section in a plane perpendicular to the stick axis 50,53 which is shaped like a circle, corresponding to the cylindrical outer surface of the respective joystick 44,46, but extending towards one radial direction to form the lateral protrusion 52. With other words, the upper end sections of the joysticks 44,46 are not round or cylindrical but non circular or at least irregular.

As can be taken from FIG. 3, the respective lateral flag-shaped protrusions 52 of the first joystick 44 and the second joystick 46 point towards each other. This position represents a neutral position of each joystick 44,46, from which each of the first joystick 44 and second joystick 46 can be turned around its stick axis 50,53. According to the present embodiment, this turning movement is performed against a restoring torque, by which each of the joystick 44 and the second joystick 46 is set back to its neutral position shown in FIG. 3. That is, with no manual force applied to turn the respective joystick 44,46, they return to their neutral position. The same stands for their tilting movements around their tilting control axes, which is performed against a restoring force to push each joystick 44,46 back into a neutral position, shown in FIG. 3.

As will be further explained in the following with respect to FIG. 4, the first joystick 44 and the second joystick 46 are configured to control the different movements X1, X2, Y1, L1 and L2 of the turnable ladder 12, as explained above with respect to FIG. 1.

Figure 4:
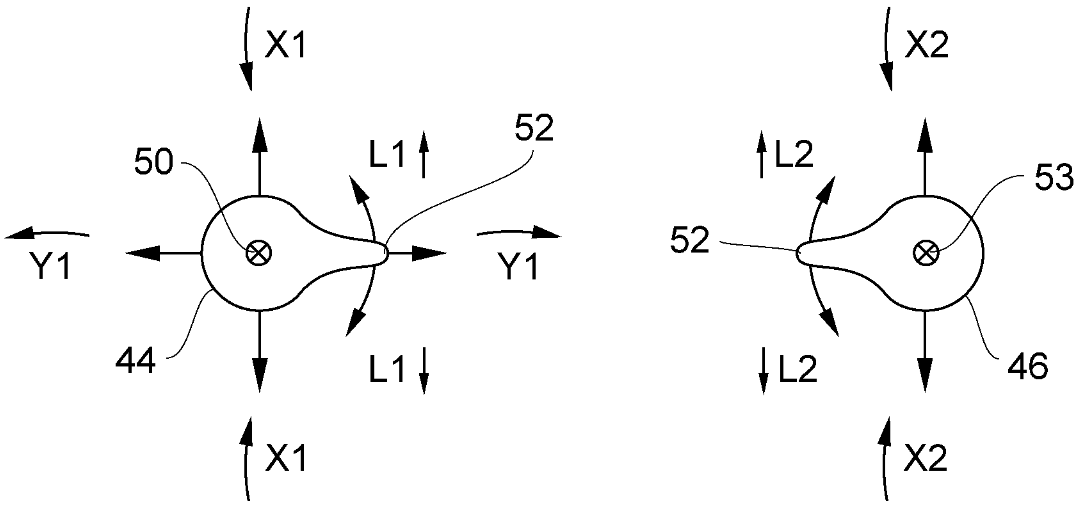
FIG. 4 is a schematic view demonstrating the allocation of the different movements of the control devices of the control center shown in FIGS. 2 and 3 to the different degrees of freedom shown in FIG. 1.

The first joystick 44 is configured to control the first inclination movement X1, i. e. the inclination of the main boom part 14, by tilting the first joystick 44 around its horizontal traverse tilting axis, which shall be denoted here as its first control axis, as demonstrated in the scheme in FIG. 4 on the left side, showing the first joystick 44 schematically from the top, with its lateral protrusion 52 pointing to the right. Moreover, the left/right tilting movement of the first joystick 44 around a second control axis perpendicular to the first control axis controls the rotation of the main boom part 14 around the turret 16, i. e. the rotation movement Y1 in opposite directions. Pushing the first joystick 44 to the left/right side corresponds to a swiveling movement of the main boom part 14 to the left/right side, respectively, while the first joystick 44 in the front/rear direction corresponds to lifting or lowering the second end 18 of the main boom part 14.

Moreover, rotating the upper end section of first joystick 44 around its stick axis 50 controls the first telescopic movement L1 of the main boom part 14. In the present embodiment, rotating the end section of the first joystick 44 in the counterclockwise direction corresponds to an extraction movement of the main boom part 14, while rotating it in the opposite clockwise direction corresponds to a retraction of the main boom part 14.

In the neutral position of the first joystick 44, shown in FIG. 4, the stick axis 50 of the first joystick 44, its first control axis and its second control axis (the latter extending in the front/rear direction, corresponding to the extension direction of the arm rest 38 in FIGS. 2 and 3) all stand perpendicular to each other. In the tilting movements around the first control axis and the second control axis, respectively, the stick axis 50 is tilted with respect to at least one of the other of the first and second control axis.

As can be taken from the right portion of FIG. 4, the second joystick 46 has generally the same shape as the first joystick 44. In more detail, the second joystick 46 comprises a horizontal traverse tilting control axis, around which the second joystick 46 can be tilted in the forward/rearward direction for controlling the inclination movement of the extension boom part 22 with respect to the main boom part 14, i. e. the second inclination movement X2. Together with the first joystick 44, both inclination movements, namely the first inclination movement X1 of the main boom part 14 and the second inclination movement X2 of the extension boom part 22 are controlled, respectively, by tilting the respective first joystick 44 and second joystick 46 around a traverse control axis, which is the first control axis in case of the first joystick 44, and which is the traverse tilting control axis of the second joystick 46. By this arrangement, the respective inclination movements X1 and X2 can be controlled by separate joysticks 44,46 but control operations which are similar to each other, each including a forward/rearward tilting movement. This facilitates the control of the respective inclination movements X1 and X2 by a human operator.

Moreover, an extension and retraction of the extension boom part 22 in a second telescopic movement L2 can be controlled by rotating the upper end portion of the second joystick 46 around its stick axis 53. By applying a torque to this upper end portion of the second joystick 46 at its lateral protrusion 52 in a circumferential direction, the extension boom part 22 is extended and elongated. By applying a torque to the lateral protrusion 52 of the second joystick 46 in the opposite counterclockwise direction, the extension boom part 22 is retracted. Together with the first joystick 44, the respective first and second telescopic movements L1 and L2 of the main boom part 14 and the extension boom part 22 are controlled by similar control operations to the respective first and second joysticks 44,46, namely by turning the respective first joystick 44 and second joystick 46 around their respective stick axes 50,53. A respective extraction movement corresponds to a control operation of turning the respective first or second joystick 44,46 in a forward direction (which is the counterclockwise direction at the first joystick 44, and the clockwise direction at the second joystick 46, as demonstrated in FIG. 4), and a retraction movement corresponds to an operation of turning the respective joystick 44,46 in the opposite direction, i. e. turning the lateral protrusion 52 towards the operator. This way of operating the first joystick 44 and second joystick 46 is an intuitive way of controlling the first telescopic movement L1 and second telescopic movement L2.

It is noted that the different degrees of freedom of the movements of the main boom part 14 and the extension boom part 22 are controlled independently by two different control devices, represented by the first joystick 44, controlling the movements of the main boom part 14, and the second joystick 46, controlling the movements of the extension boom part 22. In an embodiment in which no extension boom part 22 is present at the second end of the main boom part 14, the second joystick 46 can be dispensed completely. In this case only the first joystick 44 may be present as the only control device for controlling the main boom part 14 and all of its movements. Moreover, it is noted that like a common joystick, the second joystick 46 of the embodiment described above may have a horizontal tilting control axis perpendicular to the described tilting control axis for controlling the second inclination movement X2, which is not used in the embodiment described in connection with FIG. 4. However, this additional tilting control axis can be used for other operation and controlling purposes, which shall not be described here.

The positions and functions of the first joystick 44 and the second joystick 46 can be interchanged between each other. In particular, the first joystick 44 can be provided on the right side of the apparatus seat 32, while the second joystick 46 may be provided on the left side of the apparatus seat 32.

As can be taken from FIGS. 2 and 3, each of the first joystick 44 and the second joystick 46 comprises a switch disposed at the front of its top end, to be operated by one finger of the operator. In the present embodiment, each switch is configured as a push button 60,62 which is activated by applying a restoring force onto the respective push button 60,62. These push buttons 60,62 may have different functions as desired. In the present embodiment, the push button 60 of the first joystick 44 may be provided for activating a communication function of the aerial device, which is activated when the push button 60 is pushed. According to another embodiment of the present invention, this push button 60 is provided for activating/deactivating a movement restriction of the aerial device 12, which may be, in the case of the present push button 60, a movement restriction of the main boom part 14. The other push button 62 of the second joystick 46 may be provided for activating or deactivating a movement restriction of the extension boom part 22. However, the operation function of the respective push buttons 60,62 can be changed arbitrary.

A third control device 64, independent from the first joystick 44 and the second joystick 46, is disposed in front of the second joystick 46 for controlling the operation of a display (not shown) in the viewing field of the operator, in front of the operator's seat 32. This third control device 64 comprises a knob 66 which can be turned into opposite directions around a turning axis, and which can also be tilted around two perpendicular axes, like the first joystick 44 or the second joystick 46, to perform different control functions assigned to the display. These functions shall not be described further here.

It is possible to provide the first joystick 44 and the second joystick 46 as proportional control devices, in which the respective tilting or rotation displacement is proportional to the movement speed. As already described above, the first joystick 44 and the second joystick 46 can also be provided so as to return into a neutral position with no pressing or pulling force being applied to the respective first joystick 44 or second joystick 46, and each joystick 44,46 can only be operated against a restoring force.

Although the joysticks 44 and 46 described herein have straight axes with the rotation axis of the upper end portion being a straight elongation of the fixed lower end portion, other embodiments are possible within the scope of the present invention in which the rotation axis of the upper end portion is inclined against the lower end portion, such that the respective joystick 44, 46 comprises a bend or kink.

The invention claimed is:

1. An aerial device and a control center for the aerial device comprising:

a main boom part mounted with a first end on a turret, the main boom part being:

inclinable around a horizontal axis in a first inclination movement, rotatable around a vertical axis in a rotation movement, and extendable and retractable along its longitudinal extension direction in a first telescopic movement;

a control center comprising a first joystick configured for:

controlling the first inclination movement by tilting the first joystick around a first control axis, controlling the rotation movement by tilting the first joystick around a second control axis perpendicular to the first control axis, and for controlling the first telescopic movement by rotating at least a section of the first joystick around a stick axis of the first joystick;

wherein the aerial device further comprises an extension boom part mounted to a second end of the main boom part by a hinge mounting and being inclinable around a horizontal hinge axis with respect to the main boom part in a second inclination movement and the control center comprises a second joystick configured for controlling the second inclination movement by tilting the second joystick around a tilting control axis of the second joystick, and wherein the extension boom part is extendable and retractable along a longitudinal extension direction thereof in a second telescopic movement, and the second joystick is configured for controlling the second telescopic movement by rotating at least a section of the second joystick around a stick axis of the second joystick;

wherein the first joystick and the second joystick are configured to allow an operator to directly control the first inclination, rotation, and first telescopic movement of the main boom part using the first joystick and directly control the second inclination and second telescopic movement of the extension boom part attached to the main boom part using the second joystick and such movements of the main boom part and the extension boom part are independently controllable by the first and second joysticks, respectively; and wherein the section of the first joystick is configured to rotate about the stick axis of the first joystick from a neutral position in response to a rotating force applied to such section and thereafter return to the neutral position when no manual force is applied thereto.

2. The aerial device and control center according to claim 1, wherein the first joystick comprises a lateral protrusion protruding from the stick axis in a radial direction.

3. The aerial device and control center according to claim 2, wherein the lateral protrusion has a substantially planar sidewall.

4. The aerial device and control center according to claim 1, wherein the second joystick comprises a lateral protrusion protruding from the stick axis in a radial direction.

5. The aerial device and control center according to claim 1, wherein at least one of the first joystick and the second joystick comprises at least one switch disposed on a top end thereof or on a circumferential surface thereof.

6. The aerial device and control center according to claim 5, wherein the at least one switch is a movement restriction control switch for at least one of activating and deactivating a movement restriction of the aerial device.

7. The aerial device and control center according to claim 5, wherein the at least one switch comprises a communication control switch for the aerial device.

8. The aerial device and control center according to claim 1, comprising at least one armrest, with the first joystick being disposed at a front end of the armrest.

9. The aerial device and control center according to claim 8, wherein the first control axis of the first joystick is generally perpendicular to an extension direction of the armrest.

10. The aerial device and control center according to claim 1, comprising an operator's seat, with a backrest and left and right armrests disposed laterally at two opposite sides of the backrest, with the first joystick being disposed at a first armrest of the left and right armrests, and the second joystick being disposed at a second armrest of the armrests.

11. The aerial device and control center according to claim 10, wherein the tilting control axis of the second joystick is generally perpendicular to an extension direction of the second armrest.

12. A firefighting vehicle in combination with the aerial device and control center according to claim 1, wherein the turret and the main boom part form a turnable ladder of the firefighting vehicle, and the control center is adapted to control the turnable ladder according to claim 1.

13. The aerial device and control center according to claim 1, wherein the extension boom part comprises an extension of the main boom part in a radial direction from the turret.

* * * * *